United States Patent [19]

Koff

[11] 4,399,351

[45] Aug. 16, 1983

[54] ELECTRIC HEAT EXCHANGE COOKING APPARATUS

[76] Inventor: William Koff, 2100 S. Ocean La., Ft. Lauderdale, Fla. 33316

[21] Appl. No.: 311,365

[22] Filed: Oct. 15, 1981

Related U.S. Application Data

[63] Continuation-in-part of Ser. No. 213,271, Dec. 5, 1980, abandoned.

[51] Int. Cl.³ .............................................. H05B 1/02

[52] U.S. Cl. .................................... 219/433; 219/430; 219/432; 219/435; 219/447; 219/449; 219/462; 219/530

[58] Field of Search ............... 219/430, 432, 433, 434, 219/435, 438, 439, 441, 442, 447, 449, 455, 462, 530, 540

[56] References Cited

U.S. PATENT DOCUMENTS

| | | | |
|---|---|---|---|
| 726,241 | 4/1903 | Ayer | 219/433 |
| 968,441 | 8/1910 | Ayer | 219/433 |
| 1,120,884 | 12/1914 | Ayer | 219/433 |
| 2,269,689 | 1/1942 | Reichold | 219/441 |
| 2,427,945 | 9/1947 | Clark et al. | 219/449 X |
| 2,850,616 | 9/1958 | Hatch | 219/433 |
| 2,872,560 | 2/1959 | Bowles | 219/433 |
| 2,961,876 | 11/1960 | Wantz et al. | 219/449 X |
| 3,760,156 | 9/1973 | Kehl et al. | 219/447 |
| 4,051,346 | 9/1977 | Lenmark | 219/436 X |
| 4,164,645 | 8/1979 | Dogliotti | 219/452 |
| 4,203,027 | 5/1980 | O'Hare et al. | 219/433 X |
| 4,270,067 | 5/1981 | Thomas et al. | 219/438 |
| 4,313,050 | 1/1982 | Abenaim | 219/432 |

*Primary Examiner*—Volodymyr Y. Mayewsky

[57] ABSTRACT

An electric heat exchange cooking unit for use, selectively, with any one of a plurality of different cooking receptacles, has a heat exchange member including locking mechanism for mechanically constraining the flat undersurface of the cooking receptacle in intimate face to face contact with the top, flat surface of the heat exchange member upon the selected cooking receptacle being fully locked in place. The heat exchange member is of cast metal having embedded therein a continuous electrical heating element of such configuration as distributes heat substantially uniformly throughout the upper surface of the heat exchange member while at the same time providing a central opening within which is received a remote-indicating temperature sensor for measuring the degree of heat being uniformly applied to the food being cooked in the selected cooking receptacle.

7 Claims, 4 Drawing Figures

29 27 26a 19 21 16a 16b 11a 31 34 47 48 23 24 39 50 40 50 150° 250° 350° °F

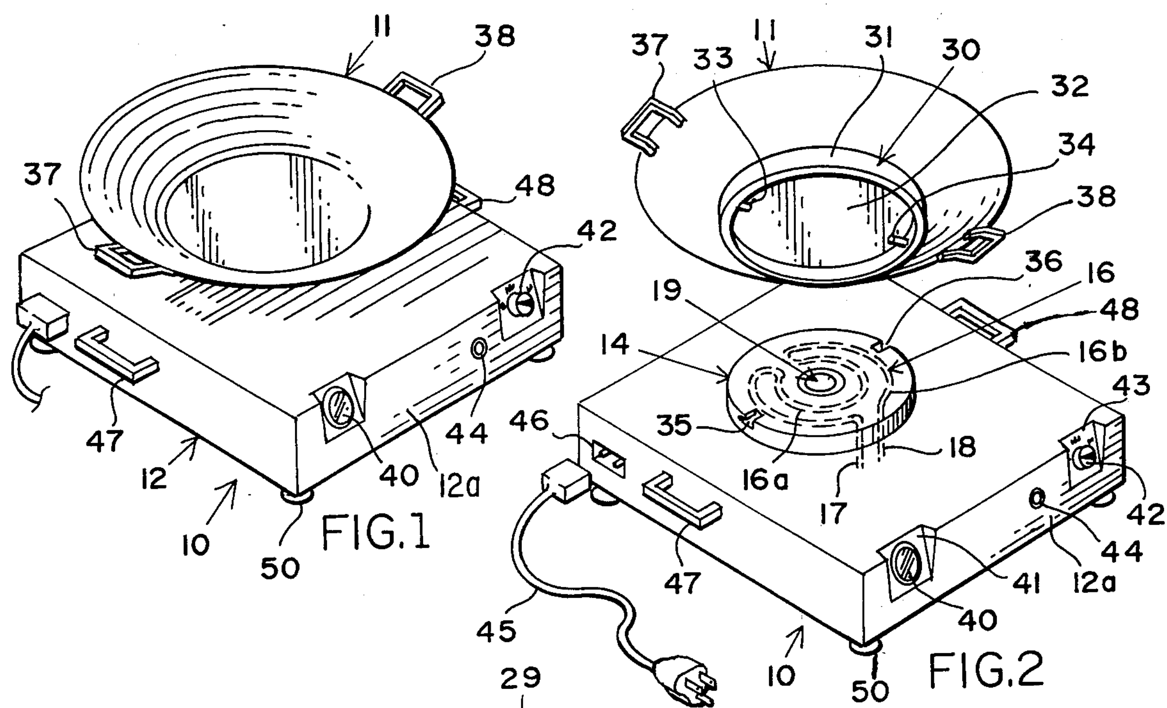
11
38
37
48
42
47
12
40
44
12a
10
50
FIG.1
37
33
11
31
30
32
34
38
36
16
19
48
14
16b
43
46
35
16a
18
17
42
44
47
41
12a
45
40
10
50
FIG.2
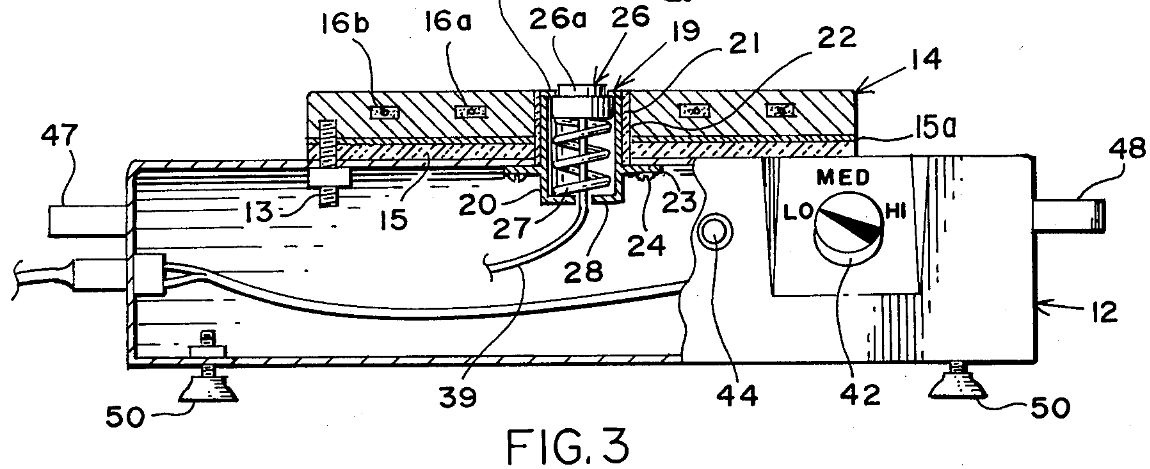
29
26a
26
19
21
22
16b
16a
14
15a
47
MED
48
LO
HI
13
15
20
27
23
24
28
12
39
44
42
50
50
FIG.3
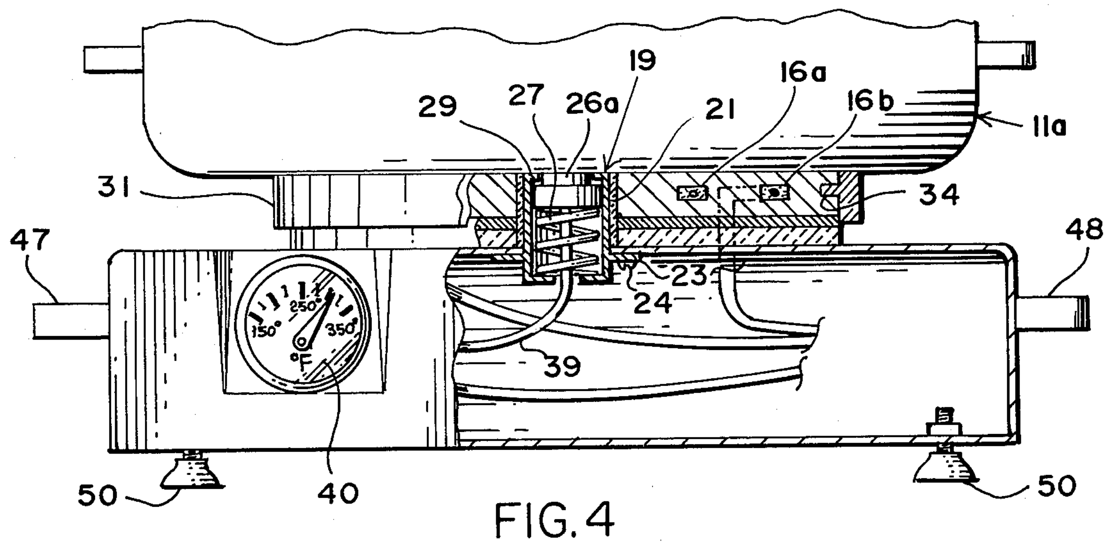
19
16a
29
27
26a
21
16b
11a
31
34
47
48
23
24
150°
250°
350°
°F
39
50
40
50
FIG.4

ELECTRIC HEAT EXCHANGE COOKING APPARATUS

This application is a continuation-in-part of applicant's U.S. patent application Ser. No. 6/213,271 filed on Dec. 5, 1980, now abandoned.

BACKGROUND OF THE INVENTION

This invention relates to electric cooking apparatus and is directed particularly to an electric cooking system including a common electric heat exchange cooking unit and a plurality of cooking receptacles for different cooking purposes which can be selectively interengaged with the common heat exchange cooking unit for use as desired in cooking various foods.

The use of electric hot plates or flat, electrically energized heating elements of one kind or another in either single heating element, portable form, or in electric ranges, is well known. See, for example, U.S. Pat. Nos. 726,241; 968,441; and 1,120,884 to Ayer; U.S. Pat. No. 2,850,616 to Hatch; and U.S. Pat. No. 2,872,560 to Bowles. Such electric hot plates or electric range heating elements or pads are designed for use with flat-bottom cooking pots or pans seated thereupon for heat exchange through the bottom. While versatile in usage, such heating of ordinary pots and pans is generally inefficient and uneven not only because intimate surface-to-surface contact cannot be achieved, but also because uniformity of face-to-face contact between the heating member and the bottom surface of the cooking receptacle being heated can rarely be achieved. This is true not only because flat-bottom cooking utensils, even if of the best quality, become uneven or lose their high degree of flatness at the bottom due to scrubbing and wear and tear after a short period of usage, which is often imperceptible to the eye, but also because the flat heating members, likewise being exposed to the wearing effects of utensils being placed on and being moved therefrom, soon losetheir flatness. The overall result of these deficiencies not only is uneven distribution of heat through the bottom of the cooking receptacle, which may result in hot spots or even burning at localized areas, but also inefficiency of heat transfer and wastage or uneconomical usage of electrical energy.

Another deficiency in electric hot plate cooking utensils heretofore devised resides in the design of the hot plate electric heating mechanism itself, resulting in uneven temperatures at the heat exchange surface and consequent hot spots and burning in the cooking utensil even with intimate contact for efficient heat transfer between the hot plate surface and the cooking utensil.

BRIEF SUMMARY OF THE INVENTION

It is, accordingly, the principal object of this invention to provide a novel and improved electric heat exchange cooking system for cooking utensils which obviates the deficiencies of electrical cooking or heating systems for this purpose heretofore devised.

A more particular object is to provide an electric cooking system including a cooking unit having a heat exchange member adapted to be received within a complementary recess in any one of a plurality, selectively, of heat collector base members, each of said base members being attached to the flat undersurface of different food container or cooking receptacle, whereby substantially all of the electrical heat energy being supplied to a selected heat exchange member will in turn be transferred evenly through the bottom of its associated cooking receptacle so as to achieve even heat distribution with high efficiency.

Another object of the invention is to provide an electric cooking system with exchangeable cooking receptacles of the character described, wherein usage in selectively coupling and removing the various cooking receptacles will have a tendency to improve rather than interfere with the flatness of the interfitting heat exchange surface areas of the heat exchange member and any one of the heat collector base members, so as to insure even heat transfer and efficiency of operation over a long period of usage.

Another object of the invention is to provide an electric cooking system with exchangeable cooking receptacles wherein the heat exchange unit or hot plate comprises an electrical heating element of such configuration that, when cast into its housing, distributes heat evenly in all directions, while at the same time providing a central opening to accommodate a heat sensor insulated from the surrounding wall of the heat exchange unit and operative to make intimate contact with the cooking utensil being used to accurately measure the temperature of the undersurface thereof.

Another object is to provide an electric heat exchange cooking system of the character described wherein the heat sensor, in addition to reading the temperature of the utensil in which food is being cooked, is thermostatically controlled to supply heat at any desired temperature, no matter what the size, shape, thickness or function of the selected cooking utensil.

Another object of the invention is to provide an electric heat exchange cooking system of the above nature which is not only suited to personal and portable usage for cooking in the home, and in mobile homes or at campsites where electrical power service is available, where storage space is at a premium, and where economy of operation may be of special importance, but is also well adapted to use in residential or commercial ranges utilizing a plurality of the heat exchange cooking units, any one of which could be used, as desired, with any one of a plurality of complementary cooking receptacles.

Other objects, features and advantages of the invention will be apparent from the following description when read with reference to the accompanying drawings.

BRIEF DESCRIPTION OF THE DRAWINGS

In the drawings, wherein like reference numerals denote corresponding parts throughout the several views:

FIG. 1 is an oblique view, as seen from above, of a preferred embodiment of the electric heat exchange cooking unit, shown with one of the cooking receptacles attached thereto;

FIG. 2 is an oblique view, similar to that of FIG. 1, but showing the cooking receptacle separated therefrom and tilted to reveal constructional details of the interconnecting mechanism and the heat exchange member;

FIG. 3 is a front elevational view of the heat exchange cooking unit shown in FIG. 2, with portions broken away to reveal constructional details; and FIG. 4 is a front elevational view of the electric heat exchange cooking unit as shown with the cooking receptacle attached thereto in heat-exchange relation, and further illustrating constructional details.

DETAILED DESCRIPTION OF THE INVENTION

Referring first to FIGS. 1 and 2 of the drawings, reference numeral 10 designates an electric heat exchange cooking unit comprising the invention, the same being illustrated in FIG. 1 with a cooking receptacle 11 removably attached thereto, ready for cooking. As best illustrated in FIGS. 2, 3 and 4, the electric cooking unit 10 comprises a rectangular housing 12 upon the upper surface of which is secured, as by stud bolts 13 (see FIG. 3, only one bolt illustrated), a circular heat exchange member 14. A layer of heat insulation material 15 having heat reflective properties in the upward direction is sandwiched between the underside of heat exchange member 14 and the top surface of the housing 12. The heat reflective property of the insulation material 15 is preferably achieved by providing the upper surface with a reflective layer or coating of aluminum, indicated at 15*a*, for example. With reference to FIG. 2, it will be seen that the heat exchange member 14 is located centrally from side to side, and somewhat rearwardly of the front panel 12*a* of the rectangular housing 12.

The heat exchange member 14, which will preferably be formed of integrally cast metal so as to be highly heat conductive, has embedded therein an electric heating element 16 (see FIG. 2) bent of a single length thereof to define a concentric pair of substantially circular inner and outer electric heating element portions 16*a* and 16*b*, respectively. The electrical heating element 16 will prefereably be of the flat CALROD type having a tubular metal outer jacket containing a central electrical resistance wire insulated from the outer jacket by an inermediate ceramic sleeve. Since such CALROD type heating elements are known and widely employed in electric ranges and the like for directly heating cooking utensils, it is not deemed to be necessary to describe such heating elements in greater detail herein. For the energizing connector ends 17, 18 of the electric heat element project through the bottom in closely spaced relation near the outer rim of the heat exchange member to extend arcuately to each side at somewhat less than a 180 circular degrees, thereby defining the outer heating element portion 16*b*, whereafter they continue, upon being reversely bent at their outer ends, to define the inner circular portion 16*a* extending slightly less than 360 circular degrees. With this configuration of electric heating element 16, the electric heating is distributed substantially uniformly upwardly in all direction within the highly conductive casting of the heat exchange member in which the heating element 16 is embedded, while at the same time leaving a circular central zone of said heat exchange member free to permit installation thereat of a cooking receptacle sensor assembly 19.

As best illustrated in FIG. 3, the sensor assembly 19 comprises a cylindrical housing 20 surrounded by a heat insulating sleeve 21 press-fitted together within a central opening 22 in the circular heat exchange member 14. To retain sensor assembly 19 in place, its cylindrical housing 20 is provided with a peripheral flange 23 through which machine screws 24 are applied for securement to the top panel of the rectangular housing 12. The temperature sensor assembly 19 comprises a cylindrical temperature sensor button 26, a reduced diameter portion 26*a* of which normally projects slightly above the flat upper surface of the circular heat exchange member 14. A helical compression spring 27 constrained between an inwardly directed annular flange 28 at the lower end of sensor assembly housing 20 and an inwardly directed annular flange 29 at the upper end thereof serves to yieldingly urge the reduced diameter portion 26*a* of a temperature sensor button 26 in its normal, slightly elevated position with respect to the upper surface of the circular heat exchange member 14, to be contacted by the under-surface of a cooking receptacle in the manner and for the purpose hereinafter described.

The heat exchange member 14 is interconnectable, selectively, with a heat collector base member 30 secured against the underside of one each of a plurality of cooking receptacles, two cooking receptacles 11 (see FIGS. 1 and 2) and 11*a* (see FIG. 4) being illustrated by way of example. The heat collector base member 30 of cooking receptacle 11 comprises a central, cylindrical ring 31 welded or otherwise secured against a central, flat underside portion 32 of the receptacle 11. As illustrated in FIG. 2, the inner wall of the cylindrical ring 31 is provided with a pair of diametrically-opposed, inwardly-projecting pins 33, 34 receivable, one each, within diametrically-opposed, L-shaped slots 35, 36 formed in the top and peripheral sidewall of the circular heat exchange member 14. The horizontal portions of the L-shaped slots 35, 36 extend outwardly at a slightly downwardly inclined angle so that when the cylindrical ring at the underside of a selected cooking receptacle is placed concentrically over the circular heat exchange 14 with the pins 33, 34 engaged within the L-shaped slots 35, 36, respectively, and the cooking receptacle is thereafter turned slightly in the clockwise direction, the flat underside portion 32 of the receptacle will be brought into intimate contact with the upper surface of said heat exchange member. At the same time, the temperature sensor button 26 will have been depressed against the reactive force of helical compression spring 27 to insure intimate contact between the upper sensing surface of said button and the bottom wall of the cooking utensil being used. To facilitate handling, placement, and locking in place of a selected cooking utensil, diametrically-opposed, U-shaped handles 37, 38 are provided. It is to be noted that the cylindrical ring 31 of the heat collector base member 30, when in place, overlies the outer peripheral edge of its associated heat exchange member 14 to minimize sideward heat radiation and thereby increase the efficiency of uniform heat transfer from said heat exchange member to the bottom wall of the utensil in which food is being cooked.

The electrical conductors 39 of the temperature sensor button 26 are connected in an energizing circuitry with a dialtype, moving-pointer, temperature gauge 40 mounted within an inclined recess 41 in the housing front panel 12*a*. A manually-controlled rotary, temperature selector unit 42 is mounted within an inclined recess 43 at the opposite side of housing front panel 12*a*. A pilot light 44 between temperature gauge 40 and temperature selector unit 42 indicates when electric heat is being supplied to the heat exchange member 14. Electrical supply cord 45 receivable in an electrical socket 46 mounted in the sidewall of rectangular housing 12 serves to energize the heat exchange cooking unit. Since electrical circuitry for energizing electrical heating elements automatically as controlled by electrical thermostat devices including temperature indicators is known, such circuitry is not detailed herein.

As best illustrated in FIGS. 2 and 3, the sidewalls of the rectangular housing 12 are provided with opposed handles 47, 48 for convenience in moving the heat exchange cooking until from place to place, and the bottom panel of said housing is fitted with corner suction cups 50 to provide for a firm grip upon a flat surface.

With reference to FIG. 4, it will be noted that when a cooking receptacle is assembled for cooking to the electric cooking unit 10, the associated heat exchange member 14 will be closely confined within the circular recess defined by the heat collector base cylindrical ring 31, thereby thermally insulating the heat exchange member to further enhance the efficiency and uniformity of heat transfer from the electric heating element 16 to the food to be cooked in the receptacle. In this connection, it will be understood that as an alternative to the still air contained within the housing 12 serving as an insulating medium, the housing could be filled with a suitable solid or fibrous heat resistant and insulating material.

While I have illustrated and described herein only one form of electric heat exchange cooking unit and associated heat collector base member comprising the invention, it is to be understood that this embodiment is presented by way of example only and not in a limiting sense. The invention, in brief, comprises all the embodiments and modifications coming within the scope and spirit of the following claims.

What I claim as new and desire to secure by Letters Patent is:

1. An electric cooking system for use, selectively, with one at a time of plurality of different cooking receptacles, comprising, in combination, a heat exchange member, said heat exchange member having an upper heat exchange surface, housing means for supporting said heat exchange member, a layer of thermal insulation between the underside of said heat exchange member and said housing means, a plurality of cooking receptacles, each for a different cooking purpose, each of said cooking receptacles having a heat exchange undersurface area, a heat collector base member fixed with respect to said heat exchange undersurface, said heat exchange undersurface having substantially the same surface configuration as that of said upper heat exchange surface, means for releasably interconnecting said heat collector base members and their respective associated cooking receptacles, one at a time, with said heat exchange member so that their respective heat exchange surfaces are in intimate contact, said heat exchange member being circular and of cast metal, an electrical heating element embedded in said cast metal, said electrical heating element being of elongated configuration bent to define substantially circular, concentric, inner and outer electric heating element portions within said cast metal, a cylindrical electrical sensor projecting upwardly through a central opening in said cast metal and being thermally insulated from said cast metal, resilient means urging the upwardly-projecting surface of said electrical sensor into intimate abutting contact with the heat exchange surface of a selected cooking receptacle interconnected with said heat exchange member, means for measuring the temperature sensed by said electrical sensor, and means for energizing said heating element.

2. An electric heat exchange cooking unit as defined in claim 1 wherein said heat collector base member is in the form of a cylindrical ring projecting downwardly of the heat exchange undersurface area of its associated cooking receptacle, said ring being of such diameter as to be received circumjacently with respect to the outer periphery of said heat exchange member case metal upon said selected cooking receptacle being releaseably interconnected with said heat exchange member.

3. An electric heat exchange cooking unit as defined in claim 2 wherein said means for releaseably interconnecting said heat collector base members and their respective associated cooking receptacles comprises a pair of diametrically opposed pins projecting inwardly of the inner peripheral wall of said rings, receivable, one each, within a pair of diametrically, opposed, L-shaped slots formed in the top and peripheral sidewall of said circular heat exchange member.

4. An electric heat exchange cooking unit as defined in claim 1, including a thermostat in circuit with said heating element energizing means for automatically controlling the temperature of heat being supplied to the interconnected receptacle by said heat exchange member.

5. An electric heat exchange cooking unit as defined in claim 1 wherein said resilient electrical sensor urging means comprises a helical compression spring, one end of said spring being constrained against the undersurface of said electrical sensor.

6. An electric heat exchange cooking unit as defined in claim 5 wherein said heat exchange member is in the form of a cylindrical disk.

7. An electric heat exchange cooking unit as defined in claim 5 wherein said housing means comprises a box-like housing having a flat upper surface with respect to which said heat exchange member is secured, said thermal insulation layer being sandwiched between said heat exchange member and said upper surface of said housing.

* * * * *